(12) United States Patent
Kruglick

(10) Patent No.: US 8,234,431 B2
(45) Date of Patent: Jul. 31, 2012

(54) INTERRUPT MASKING FOR MULTI-CORE PROCESSORS

(75) Inventor: Ezekiel John Joseph Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 30 days.

(21) Appl. No.: 12/578,270

(22) Filed: Oct. 13, 2009

(65) Prior Publication Data

US 2011/0087815 A1    Apr. 14, 2011

(51) Int. Cl.
*G06F 13/24* (2006.01)

(52) U.S. Cl. ......... 710/262; 710/200; 710/240; 718/102

(58) Field of Classification Search .......... 710/260–269, 710/200, 240–244; 718/102
See application file for complete search history.

(56) References Cited

U.S. PATENT DOCUMENTS

| | | | |
|---|---|---|---|
| 4,047,161 A | 9/1977 | Davis | |
| 4,482,954 A | 11/1984 | Vrielink et al. | |
| 4,779,194 A | 10/1988 | Jennings et al. | |
| 4,964,040 A | 10/1990 | Wilcox | |
| 5,065,310 A | 11/1991 | Stone | |
| 5,179,707 A | 1/1993 | Piepho | |
| 5,283,904 A | 2/1994 | Carson et al. | |
| 5,313,584 A | 5/1994 | Tickner et al. | |
| 5,371,872 A | 12/1994 | Larsen et al. | |
| 5,379,428 A | 1/1995 | Belo | |
| 5,410,710 A | 4/1995 | Saragdhar et al. | |
| 5,452,452 A | 9/1995 | Gaetner et al. | |
| 5,555,420 A | 9/1996 | Sarangdhar et al. | |
| 5,564,060 A | 10/1996 | Mahalingaiah et al. | |
| 5,613,128 A | 3/1997 | Nizar et al. | |
| 5,646,676 A | 7/1997 | Dewkett et al. | |
| 5,889,978 A | 3/1999 | Jayakumar | |
| 5,918,057 A | 6/1999 | Chou et al. | |
| 5,944,809 A | 8/1999 | Olarig et al. | |
| 6,148,361 A | 11/2000 | Carpenter et al. | |
| 6,205,508 B1 | 3/2001 | Bailey et al. | |
| 6,219,690 B1 | 4/2001 | Slingwine et al. | |
| 6,418,497 B1 | 7/2002 | Guthrie et al. | |
| 6,779,065 B2 | 8/2004 | Murty et al. | |
| 6,983,339 B1 | 1/2006 | Rabe et al. | |
| 6,996,745 B1 | 2/2006 | Shaylor | |

(Continued)

FOREIGN PATENT DOCUMENTS

EP    0 602 858 A1    6/1994

(Continued)

OTHER PUBLICATIONS

U.S. Official Action dated Jun. 8, 2010 in U.S. Appl. No. 12/423,368.

(Continued)

*Primary Examiner* — Brian Misiura
*Assistant Examiner* — Kim Huynh
(74) *Attorney, Agent, or Firm* — Hope Baldauff Hartman, LLC

(57) ABSTRACT

Technologies are generally described herein for handling interrupts within a multi-core processor. A core specific interrupt mask ("CIM") can be adapted to influence the assignment of interrupts to particular processor cores in the multi-core processor. Available processor cores can be identified by evaluating the CIM. An interrupt with an interrupt service routine ("ISR") that is received by the multi-core processor can be assigned to one or more of the available processor cores identified by the CIM.

17 Claims, 7 Drawing Sheets

U.S. PATENT DOCUMENTS

| | | | |
|---|---|---|---|
| 7,003,611 B2 | 2/2006 | Arndt | |
| 7,039,740 B2 | 5/2006 | Glasco et al. | |
| 7,117,285 B2 | 10/2006 | Ota | |
| 7,191,349 B2 | 3/2007 | Kaushik et al. | |
| 7,197,627 B1 | 3/2007 | Naylor | |
| 7,328,294 B2 | 2/2008 | Kim et al. | |
| 7,350,005 B2 | 3/2008 | Yiu et al. | |
| 7,386,002 B2 | 6/2008 | Meier | |
| 7,461,215 B2 * | 12/2008 | Hass | 711/154 |
| 7,581,052 B1 | 8/2009 | Solomita | |
| 7,594,234 B1 | 9/2009 | Dice | |
| 7,627,706 B2 | 12/2009 | Kaushik et al. | |
| 7,634,642 B2 | 12/2009 | Hochschild et al. | |
| 7,685,347 B2 | 3/2010 | Gibbs | |
| 7,809,876 B2 | 10/2010 | Balasubramanian | |
| 7,899,966 B2 | 3/2011 | Kulkarni | |
| 2002/0062381 A1 | 5/2002 | Gargiulo et al. | |
| 2002/0087775 A1 | 7/2002 | Looi et al. | |
| 2003/0101301 A1 | 5/2003 | Taniguchi | |
| 2005/0010707 A1 * | 1/2005 | Francis | 710/260 |
| 2006/0026322 A1 * | 2/2006 | Chauvel et al. | 710/260 |
| 2006/0200826 A1 | 9/2006 | Tamura et al. | |
| 2007/0106827 A1 | 5/2007 | Boatright et al. | |
| 2007/0256076 A1 | 11/2007 | Thompson et al. | |
| 2008/0140896 A1 | 6/2008 | Todoroki et al. | |
| 2009/0089470 A1 | 4/2009 | Ven | |
| 2009/0204932 A1 | 8/2009 | Bormann et al. | |
| 2009/0248934 A1 | 10/2009 | Ge et al. | |
| 2009/0320031 A1 * | 12/2009 | Song | 718/102 |
| 2009/0327556 A1 | 12/2009 | Railing et al. | |
| 2010/0262742 A1 | 10/2010 | Wolfe | |
| 2010/0274879 A1 | 10/2010 | Wolfe | |
| 2010/0287556 A1 * | 11/2010 | Munz | 718/102 |

FOREIGN PATENT DOCUMENTS

| | | |
|---|---|---|
| EP | 0 685 798 A2 | 12/1995 |
| EP | 0 827 084 A2 | 3/1998 |
| EP | 2 241 979 A1 | 10/2010 |
| JP | 2000-029719 A | 10/2001 |
| JP | 2001-290660 A | 10/2001 |
| WO | WO 95/18416 A1 | 7/1995 |

OTHER PUBLICATIONS

U.S. Official Action dated Aug. 25, 2010 in U.S. Appl. No. 12/423,368.

European Search Report dated Jul. 2, 2010 in EP Serial No. 10154704.0.

U.S. Official Action dated Nov. 26, 2010 in U.S. Appl. No. 12/423,368.

U.S. Notice of Allowance / Allowability dated Mar. 25, 2011 in U.S. Appl. No. 12/423,368.

Goutanis et al., "A method of processor selection for interrupt handling in a multiprocessor system," Dec. 1966, Proceedings of the IEEE, 54(12): 1812-1819.

Jeffay et al., "Accounting for interrupt handling costs in dynamic priority task systems," Dec. 1-3, 1993, Proceeding of the Real-Time Systems Symposium, pp. 212-221.

Manner, R., "Hardware task/processor scheduling in a polyprocessor environment," Jul. 1984, IEEE Transactions on Computers, C-33(7): 626-636.

Qu et al., "Design and implementation of RTU based on the embedded operation system µC/OS-II," Apr. 5-8, 2008, Proceedings of the 2004 IEEE International Conference on Electric Utility Deregulation, Restructuring and Power Technologies, vol. 2, pp. 623-626.

Intel, "Protection," Intel® 64 and IA-32 Architectures Software Developer's Manual, vol. 3A, System Programming Guide, Part1, Chapter 5, Sep. 2009, 50 pages.

Intel, Intel® 64 Architecture x2APIC Specification, Sep. 2007, 39 pages.

Intel, Intel® 64 Architecture x2APIC Specification, Jun. 2008, 49 pages.

U.S. Official Action dated Dec. 14, 2011 in U.S. Appl. No. 12/429,539.

U.S. Official Action dated Dec. 15, 2011 in U.S. Appl. No. 12/429,580.

International Search Report and Written Opinion dated Feb. 9, 2012 in PCT Application No. PCT/US10/52244.

U.S. Official Action dated Mar. 27, 2012 in U.S. Appl. No. 12/429,580.

U.S. Official Action dated Mar. 20, 2012 in U.S. Appl. No. 12/429,539.

Cesário, W., et al., "Component-Based Design Approach for Multicore SoCs," Proceedings of the 39th Conference on Design Automation, Jun. 10-14, 2002, pp. 6.

Smolens, J.C., et al., "Reunion: Complexity-Effective Multicore Redundancy," Proceedings of the 39th Annual IEEE/ACM International Symposium on Microarchitecture, 2006, pp. 12.

U.S. Notice of Allowance dated May 25, 2012 in U.S. Appl. No. 12/429,580.

* cited by examiner

INTERRUPT MASKING FOR MULTI-CORE PROCESSORS

BACKGROUND

Unless otherwise indicated herein, the materials described in this section are not prior art to the claims in this application and are not admitted to be prior art by inclusion in this section.

An interrupt request ("IRQ") can signal a computing system of an event to be serviced by the execution of an interrupt handler, which may also be referred to as an interrupt service routine ("ISR"). In response to receiving an IRQ, a processor in the computing system can undergo a context switch to transition from executing its current task to executing the interrupt handler associated with a received interrupt request. A transition from the current processor task can be considered an interruption of the current task. Allocating an ISR for a received interrupt request to a particular processor core within a multi-core processor for execution can present complications.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
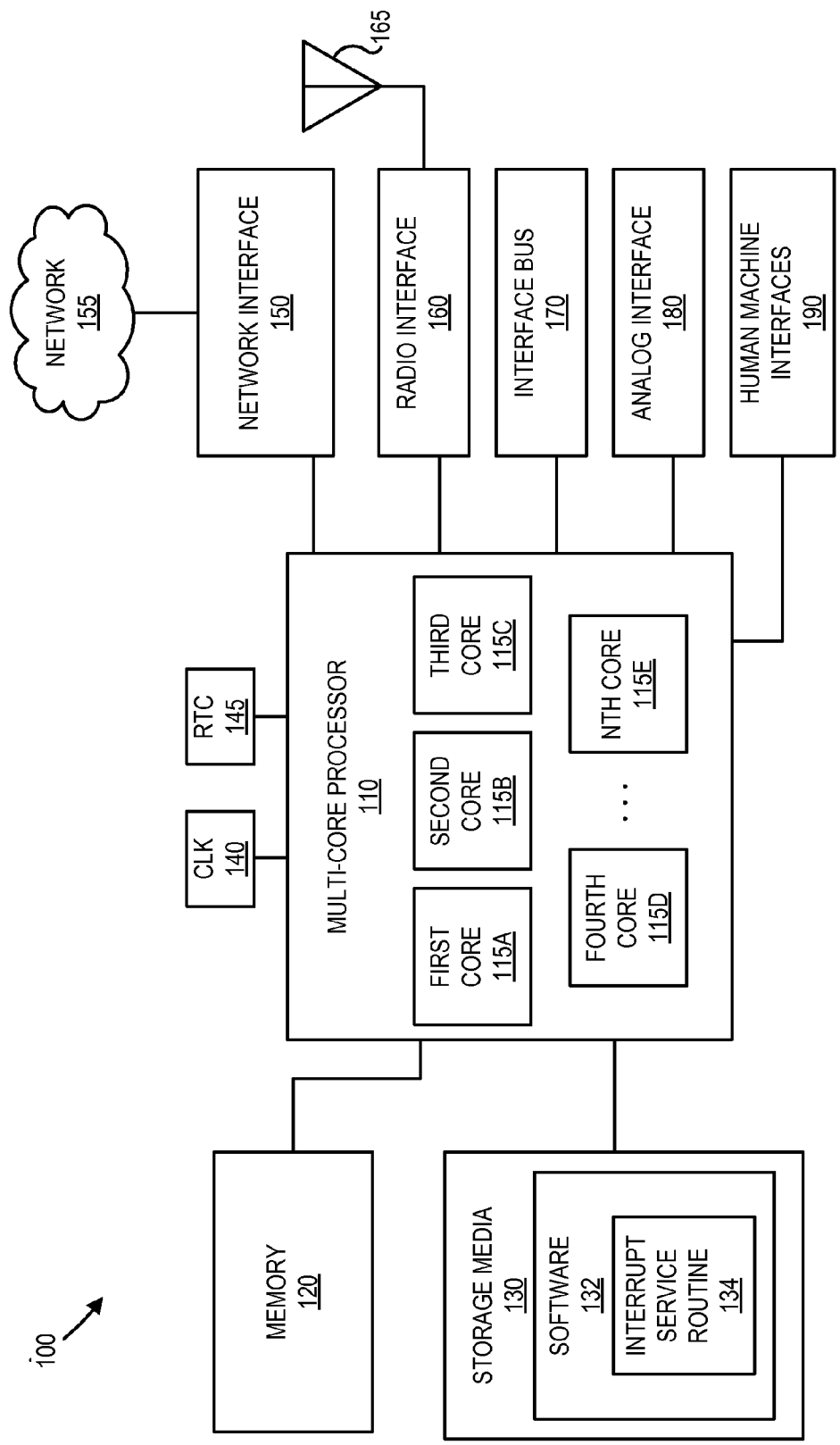
FIG. 1 is a functional block diagram illustrating an operating environment for a multi-core processor.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, and computer program products related to multi-core processors. Techniques are described to configure a core specific interrupt mask ("CIM") to influence the assignment of interrupts to particular processor cores in the multi-core processor. The CIM may be arranged to flag specific processor cores as being either available or unavailable to handle interrupts. If the CIM flags a specific processor core as being available, then a computer system that is part of the multi-core processor may route an interrupt service routine ("ISR") corresponding to an interrupt service request ("IRQ") to that specific processor core. This specific processor core may then execute the ISR. If the CIM flags a specific processor core as being unavailable, then the computer system may route the ISR away from that specific processor core to another available processor core. The computer system may configure the CIM such that processor cores that minimally impact overall system performance can be selected to execute the ISRs.

Turning now to FIG. 1, a functional block diagram 100 illustrates an operating environment for a multi-core processor 110 arranged according to at least some embodiments presented herein. A multi-core processor 110 can incorporate multiple internal processor cores such as first processor core 115A, a second processor core 115B, a third processor core 115C, a fourth processor core 115D, and an Nth processor core 115E. These may be referred to collectively, or generally, as processor cores 115. The processor cores 115 can generally support parallel processing, parallel tasks, parallel threads, separate sequential processes, or any combination thereof.

A memory 120 may be adapted for access by the multi-core processor 110. The multi-core processor 110 can be configured to read from and/or write to the memory 120. Such read and write operations may relate to both instructions and data associated with operations of the multiple cores of the multi-core processor 110. Generally, each of the processor cores within the multi-core processor 110 may be configured to individually access the memory 120. The memory 120 may be random access memory ("RAM"), static RAM ("SRAM"), dynamic RAM ("DRAM"), synchronous dynamic RAM ("SDRAM"), or any other type of volatile or non-volatile memory.

Instructions and data associated with operations on the multiple processor cores 115 of the multi-core processor 110 may be stored on one or more storage media device(s) 130. The storage media device 130 may support the nonvolatile storage of information. The storage media 130 may be adapted for access by the multiple processor cores within the multi-core processor 110. The storage media 130 can be configured to store software 132 for execution on the multiple processor cores 115 within the multi-core processor 110.

By way of example and not limitation, computer-readable media may comprise computer storage media and communication media. Computer storage media may include volatile, non-volatile, removable, and non-removable media implemented in any method or technology for the storage of information such as computer-readable instructions, data structures, program modules, or other data. Computer storage media may include, but is not limited to, RAM, read only memory ("ROM"), erasable programmable read only memory ("EPROM"), electrically EPROM ("EEPROM"), flash memory, other solid state memory technology, compact disc ROM ("CD-ROM"), digital versatile disc ("DVD"), high definition DVD ("HD-DVD"), BLU-RAY, other optical storage, magnetic cassettes, magnetic tape, magnetic disk storage such as a hard disk drive ("HDD"), other magnetic storage devices, or any other medium which can be used to store the desired information and which can be accessed by the multi-core processor 110.

The software 132, or other instructions, code, modules, or programs associated with the multi-core processor 110 may include modules adapted to respond to interrupt events. Such a module may be referred to as an ISR 134. An ISR 134 may be associated with a specific interrupt event, a specific cause of interrupt, source of interrupt, or a specific interrupt signal line, each of which may result in an interrupt request. The ISR 134 may be executed in response to the interrupt request being received at the multi-core processor 110. The ISR 134 may be arranged to interrupt, or preempt, other operations associated with the multi-core processor 110. Such preemption may support executing the ISR 134 in rapid response to the arrival of the interrupt request at the multi-core processor 110. Rapid response can support real-time, hard-real-time, soft-real-time, or near-real-time operation of various software modules.

The ISR 134 may be associated with a device driver, or other software, firmware, or modules associated with supporting external devices. In addition to external devices, such modules may support internal circuit blocks that can provide interrupt requests. The supported device, or an associated interface circuit, may be considered a source of an interrupt associated with the device driver or the ISR 134. Upon receiving an interrupt request, the associated ISR 134 may be executed immediately, within a specific time limit, or according to a priority level associated with the ISR 134 and other operations.

An external clock ("CLK") 140 can provide a clock signal to the multi-core processor 110. CLK 140 may include a crystal oscillator or any other clock or oscillator source (not shown). CLK 140 may include a clock driver circuit (not shown). The clock signal associated with CLK 140 may be used to time and synchronize various circuits within the multi-core processor 110. The multi-core processor 110 may also interface to a real time clock ("RTC") 145. The RTC 145 can be used to maintain time, such as time of day, day of week, calendar date, year, and so forth. The RTC 145 may be configured to generate interrupt events to the multi-core processor 110 related to timers, alarms, and/or watchdog circuits.

Various devices that can interface to the multi-core processor 110 can be arranged to generate interrupt requests. Such interrupt requests can signal to the multi-core processor 110 that service is requested by the device. The ISR 134 may be executed to service the interrupt request from the device. As non-limiting examples, several different devices are illustrated in FIG. 1. For example, an interrupting device may be a network interface 150. The network interface 150 may be used to attach the multi-core processor 110 to a network 155. The network interface 150 can generate an interrupt request when a data packet is received from the network 155. An interrupt handler, such as the ISR 134, associated with the network interface 150 may then be executed to receive the data packet from the network interface 150. Similarly, a radio interface 160, which may use an antenna 165 to send and/or receive wireless data packets to a wireless network or a mobile communications system, can generate interrupt requests that may be handled by ISR 134.

One or more interface buses 170 may be adapted to interface with multi-core processor 110. Examples of interface buses can include an Industry Standard Architecture ("ISA") bus, a Peripheral Component Interconnect ("PCI") bus, a PCI-Express bus, an Accelerated Graphics Port ("AGP") bus, a Universal Serial Bus ("USB"), an Advanced Technology Attachment ("ATA") bus, a Serial ATA ("SATA") bus, a Small Computer System Interface ("SCSI"), and other such buses and interfaces used in computers and embedded processor systems. The buses, or interface circuits associated with the buses, may incorporate one or more interrupt mechanisms adapted to generate interrupt requests to the multi-core processor 110. Analog interfaces 180 may be coupled to the multi-core processor 110. The analog interfaces 180 may include digital-to-analog converters ("DACs"), analog-to-digital converters ("ADCs"), or both. The analog interfaces 180 may be used for video signals, audio signals, infrared signals, radio frequency ("RF") signals, sensor signals, or any other analog signal. The analog interfaces 180, or circuitry supporting the analog interfaces 180, may be adapted to generate interrupt requests to the multi-core processor 110.

One or more human-machine interfaces 190 may also be coupled to the multi-core processor 110. Human-machine interfaces 190 may include video displays, keyboards, mice, light pens, projectors, speech recognition, switches, buttons, indicators, or any other mechanisms for receiving input from a human or providing output to a human. The human-machine interfaces 190, or circuitry associated therewith, may be adapted to provide interrupt requests to the multi-core processor 110.

It should be appreciated that the block diagram 100 of FIG. 1 is simplified and that one or more of the components shown coupled to the multi-core processor 110 may be indirectly coupled to the multi-core processor 110. In particular, various types of intermediate devices may be utilized to couple one or more components to the multi-core processor 110 as may be contemplated by one skilled in the art.

Figure 2:
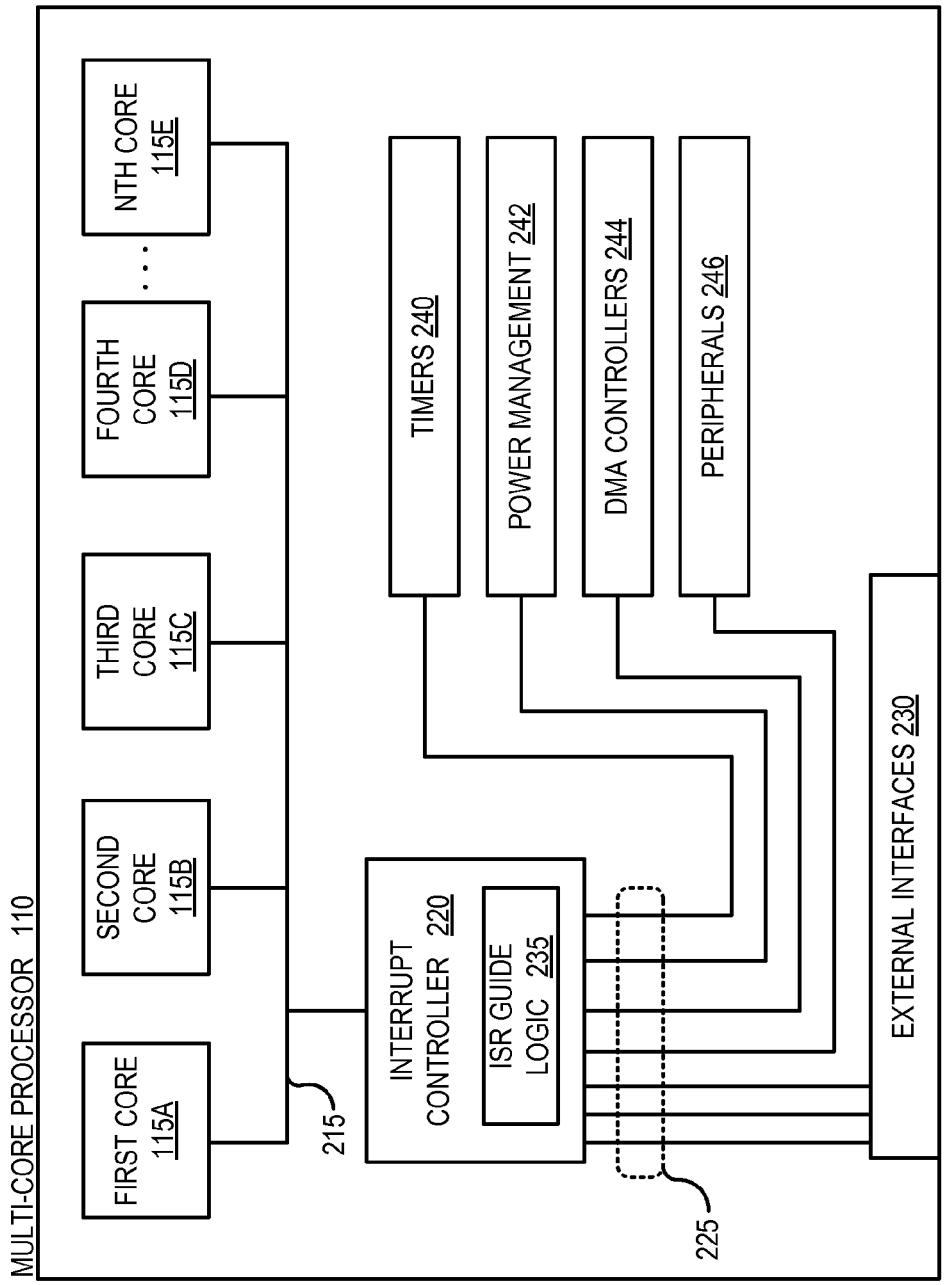
FIG. 2 is a block diagram illustrating the multi-core processor having an interrupt controller.

Turning now to FIG. 2, a block diagram illustrates the multi-core processor 110 having an interrupt controller 200 arranged according to at least some embodiments presented herein. The multi-core processor 110 may have multiple internal processor cores such as the processor cores 115. Interrupt requests arriving to the multi-core processor 110 may come from external interfaces 230. Interrupt requests associated with the external interfaces 230 may originate from external devices as discussed with respect to FIG. 1. Similarly, devices internal to the multi-core processor 110 may generate interrupt requests. For example, timers 240, power management mechanisms 242, direct memory access ("DMA") controllers 244, or other on-chip peripherals 246 may generate interrupt requests similar to interrupt requests originating from the external interfaces 230.

Various interrupt signals from internal devices and the external interfaces 230 may be carried individually on interrupt lines 225 to the interrupt controller 220. Each of the interrupt lines 225 may be associated with a separate ISR or an ISR may be associated with more than one of the interrupt lines 225. The interrupt controller 220 can interface with the processor cores 115 over an interrupt bus 215. The interrupt bus 215 can be a serial bus, a parallel bus, or any channel for communicating signals between the interrupt controller 220 and the multiple processor cores 115. The interrupt bus may be a general-purpose system, input/output ("I/O"), or memory bus that can also be used for communicating signals between the interrupt controller 220 and the multiple processor cores 115. The interrupt bus 215 can carry messages (e.g., interrupt requests) relating interrupt information between the interrupt controller 220 and the processor cores 115. The messages communicated on the interrupt bus 215 can be encoded as signals, pulses, logic levels, packets, frames, or any other representation known in the art. In further embodiments, the interrupt controller 220, the timers 240, the power management mechanisms 242, the DMA controllers 244, and/or the other on-chip peripherals 246 may be external to the multi-core processor 110.

An interrupt request can delay a currently executing process by preempting processor execution resources. Swapping from the current task to the ISR 134 can occur by a context switch. A context switch may cause operations to complete out of order. A context switch may also cause operations to be aborted and/or re-executed. A context switch may further cause internal buffers to be cleared, and/or cause caches to be altered. Cache lines and translation lookaside buffer ("TLB") entries may also be invalidated by the code or data from the ISR 134. Caches can maintain recently accessed data or code in a faster cache memory for rapid subsequent access. This may be beneficial as the notions of repeated access and locality of reference imply that recently accessed memory locations, or those nearby, may be likely candidates for access again in the near future. Interrupt response latency and interrupt processing time may be delayed if code or data associated with the ISR 134 are cached in a modified state on another processor core.

Disruptive effects may be increased in systems where interrupts are frequent, where interrupt service routines involve substantial amounts of code or data, or when a substantial amount of overall computing time is devoted to servicing interrupts. Such conditions can occur in either general-purpose or special-purpose computing systems where there are complex computing tasks involving large amounts of data tied to a real-time schedule. Similar conditions may appear in server computers that are processing large amounts of network traffic or storage system I/O operations.

When an interrupt arrives at the interrupt controller 220 (e.g., an interrupt request signal is asserted, an interrupt request message is sent, etc.), the interrupt controller 220 may assign the ISR 134 associated with the interrupt to the first available processor core of the processor cores 115. For example, a processor queue (not shown) containing a list of the processor cores 115 may be maintained. The interrupt controller 220 may traverse each of the processor cores 115 in the processor queue until a processor core that is available has been found. A processor core may be considered available if the processor core is not currently executing an operation. However, such an approach where the interrupt controller 220 assigns the ISR 134 to the first available processor core may have several drawbacks.

In a first example, the first processor core 115A and the second processor core 115B, because of their close physical proximity, may be better suited to communicate with each other in order to execute a task. The interrupt controller 220 may assign the ISR 134 to the first processor core 115A because the first processor core 115A is available. Since the first processor core 115A is occupied with the ISR 134, the second processor core 115B may be limited to completing the task with another processor, such as the Nth processor core 115E, positioned at a greater physical distance from the second processor core 115B than the first processor core 115A. The increased distance between the second processor core 115B and the Nth processor core 115E may increase the amount of time to complete the task.

In a second example, the first processor core 115A may have a close physical proximity to a particular bus. As such, the first processor core 115A may be better suited to execute a data intensive process where data is transmitted and received over the bus. If the interrupt controller 220 assigns the ISR 134 to the first processor core 115A, another processor, such as the Nth processor core 115E, may execute the data intensive process. However, the Nth processor core 115E may be positioned at a greater physical distance from the bus. This increased distance may increase the amount of time to execute the data intensive process.

In a third example, the first processor core 115A may utilize a cache for executing a task, and the cache may contain a significant amount of data. The cache may be shared by other processors, and the data in the cache may not be mirrored in other caches. When the first processor core 115 executes the ISR 134, the ISR 134 may cause the first processor core 115A to flush the cache. When the first processor core 115A returns to executing the high priority task, an access to the data previously in the cache may cause a cache miss, thereby increasing the amount of time to complete the task.

In a fourth example, the first processor core 115A and the second processor core 115B may be executing a high priority task. The first processor core 115A may become available while executing a high priority task. In particular, the first processor core 115A may be idle while awaiting data from the second processor core 115B. While the first processor core 115A is awaiting the data from the second processor core 115B, the interrupt controller 220 may assign the ISR 134 to the first processor core 115A because the first processor core 115A is idle, and thus may be considered available. As the first processor core 115A executes the ISR 134, the high priority task may be delayed until the first processor core 115A completes executing the ISR 134. The second processor core 115B may also remain idle until the first processor core 115A returns from the ISR 134 to execute the high priority task.

According to some embodiments, the CIM, as described in greater detail below, may be adapted to identify specific processor cores as being unavailable or available to execute the ISR 134. An operating system or other suitable controlling mechanism may configure the CIM such that processor cores having a significant impact on overall system performance may be specified as unavailable. When an ISR guide logic 235 in the interrupt controller 220 reads the CIM, the ISR guide logic 235 may guide the ISR 134 away from unavailable processor cores to those processor cores that have the least impact on overall system performance.

According to Amdahl's law, overall system performance improves as the percentage of parallel computing increases and the percentage of non-parallel (i.e., serial) computing decreases. By guiding interrupts to those processor cores having the least impact on overall system performance, the CIM may improve overall system performance under Amdahl's law. For example, the first processor core 115A may be executing a highly serial task. Under Amdahl's law, overall system performance may decrease if the first processor core 115A delays executing the serial task in order to handle additional serial computations, such as the ISR 134. By directing the ISR 134 to another processor core that is not executing any tasks, the interrupt controller 220 may increase the percentage of parallel computing by increasing the number of processor cores that are concurrently performing tasks.

Figure 3:
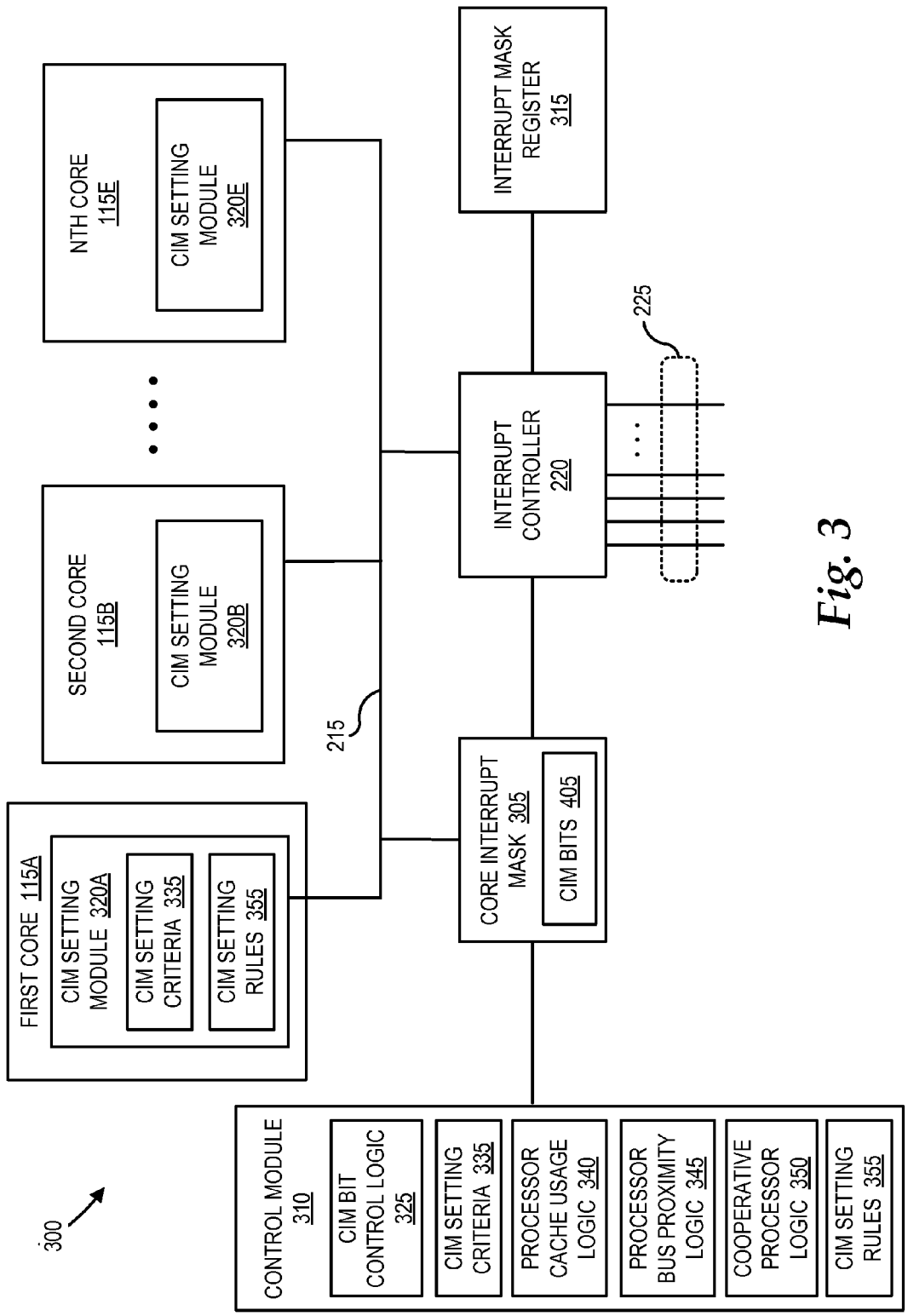
FIG. 3 is a block diagram illustrating the interrupt controller, a core interrupt mask ("CIM"), a control module, and an interrupt mask register ("IMR")

Turning now to FIG. 3, a block diagram 300 illustrates the interrupt controller 220, a CIM 305, a control module 310, and an interrupt mask register ("IMR") 315, arranged according to at least some embodiments presented herein. Although not illustrated in FIG. 3, the CIM 305 and/or the IMR 315 may be implemented within the interrupt controller 220. The interrupt controller 220 may be adapted to receive and latch IRQs arriving on one or more interrupt lines 225. In response to an IRQ, the interrupt controller 220 may identify one of the processor cores 115 to respond to the IRQ. In particular, the interrupt controller 220 may identify one of the available processor cores as indicated in the CIM 305.

According to some embodiments, the CIM 305 may be implemented as a register containing a number of bits. In some implementations, each of the bits may correspond to one or more of the processor cores 115. In other implementations, one or more bits may correspond to each of the processor cores 115. In other embodiments, the CIM 305 may be implemented as other types of hardware, software, firmware, or any combination thereof.

In some examples, each bit may correspond to a respective one of the processor cores 115. In some implementations, a "1" value in the bit may indicate that the corresponding processor core is available, and a "0" value in the bit may indicate that the corresponding processor core is unavailable. In other implementations, multiple bits may be utilized to indicate information about a corresponding processor core. For example, a "0" value in the bits may indicate that the corresponding processor core is unavailable, a "1" value in the bits may indicate that the corresponding processor cores was just made available (e.g., available for less than a first threshold number of clock cycles), a "2" value in the bits may indicate that the corresponding processor core was available for more than the first threshold number of clock cycles but less than a second threshold number of clock cycles, and a "3" value in the bits may indicate that the corresponding processor core was available for more than the second threshold number of clock cycles. In yet other implementations, the bits in multiple processor cores may be encoded. The bits in the CIM 305 may also indicate other information as may be contemplated by one skilled in the art. The ISR guide logic 235 in the interrupt controller 220 may be arranged to route the ISR 134 away from the unavailable processor cores and toward the available processor cores.

According to some embodiments, a CIM bit control logic 325 in the control module 310 can be adapted to set the values of bits 405 in the CIM 305. The control module 310 may be implemented in an operating system, a supervisory system, or other suitable centralized control mechanisms. In some further embodiments, a CIM setting module, such as a first CIM setting module 320A, a second CIM setting module 320B, and an Nth CIM setting module 320E, may also be implemented in one or more of the processor cores 115. The first CIM setting module 320A, the second CIM setting module 320B, and the Nth CIM setting module 320E may be referred to collectively, or generally, as CIM setting modules 320. The CIM setting modules 320 may enable one or more of the processor cores 115 to directly set their own corresponding bits within the CIM 305.

The CIM bit control logic 325 in the control module 310 may be configured to set the bits 405 according to a variety of CIM setting criteria 335. In a first example implementation, the control module 310 may set a processor core as unavailable when the processor core begins executing a task. By setting a busy processor core as unavailable, the control module 310 can prevent the interrupt controller 220 from potentially assigning the ISR 134 to the processor core when the processor core may become temporarily idle during execution of the task.

In a second example implementation, the control module 310 may be configured to set a processor core as unavailable when the cache associated with the processor core contains a significant amount of data. For example, a processor cache usage logic 340 in the control module 310 may determine whether the cache associated with processor core contains a significant amount of data. The data in the cache may not be mirrored in other caches associated with other processor cores. By setting a processor core having a full cache as unavailable, the control module 310 can assign the ISR 134 to those processor cores having less-utilized caches. Avoiding interrupt preemption of cores associated with highly-utilized caches can reduce the number of potential cache misses. Such cache misses may be incurred after flushing a highly-utilized cache.

In a third example implementation, the control module 310 may be configured to set a processor core as unavailable when the processor core is positioned in physical proximity to a particular bus. For example, a processor bus proximity logic 345 in the control module 310 may determine whether the processor core is positioned in physical proximity to a particular bus. By setting the processor core near the bus as unavailable, the control module 310 can assign the ISR 134 to those processor cores that are greater in physical proximity to the bus, thereby availing the processor core near the bus for executing tasks involving transmitting and receiving data over the bus.

In a fourth example implementation, the control module 310 may be configured to set a first processor core and a second processor core as unavailable when the first processor core is in physical proximity and cooperates with the second processor core. For example, a cooperative processor logic 350 may determine whether two or more processor cores are in physical proximity and cooperating with each other. By setting cooperating processor cores as unavailable, the processor cores may continue to cooperate without the interruption of handling interrupts. It should be appreciated that the above described implementations are merely examples, and that other suitable criteria may be similarly utilized.

In some implementations, the control module 310 may be configured to initially set (or change/initialize/reset) each of the bits 405 in the CIM 305 to a "1" value, indicating that each of the processor cores 115 is available. The control module 310 may be configured to change (or set/toggle) one or more of the bits 405 in the CIM 305 from the "1" value to the "0" value, indicating that the one or more corresponding processor cores 115 are unavailable. These changes may be based upon the CIM setting criteria 335, as previously described. When the CIM setting criteria 335 is no longer satisfied, the control module 310 may be configured to return (or change/re-initialize/reset) the bits 405 in the CIM 305 from the "0" value back to the "1" value.

In some implementations, the CIM setting modules 320 may be configured to initially set each of the bits 405 in the CIM 305 to a "1" value, indicating that each of the processor cores 115 is available. The CIM setting modules 320 may be configured to change one or more of the bits 405 in the CIM 305 from the "1" value to the "0 value, indicating that the one or more corresponding processor cores 115 are unavailable, based on the CIM setting criteria 335, as previously described. When the CIM setting criteria 335 is no longer satisfied, the CIM setting modules 320 may be configured to return the bits 405 in the CIM 305 from the "0" value back to the "1" value.

In some implementations, the control module 310 or the CIM setting modules 320 may be configured to initially set each of the bits 405 in the CIM 305 to a "0" value, indicating that each of the processor cores 115 is unavailable. The control module 310 may receive an instruction from one or more of the processor cores 115, and in particular one or more of the CIM setting modules 320, volunteering to handle interrupts. In response to receiving the instruction, the control module 310 may be adapted to change the bits 405 within the CIM 305 corresponding to the volunteering processor cores 115 from the "0" value to the "1" value, indicating that the respective processor core 115 is available. The control module 310 may also be arranged to receive an instruction from one or more of the processor cores 115 to cancel the offer to handle interrupts, thereby causing the control module 310 to return the bits 405 in the CIM 305 from the "1" value back to the "0" value. In the alternative, the CIM setting modules 320 may be configured to directly change the bits 405 corresponding to the volunteering processor cores 115 from the "0" value to the "1" value and from the "1" back to the "0" value.

According to some embodiments, the control module 310, when setting the bits 405 of the CIM 305, may implement CIM setting rules 355 that prevent more than a threshold number of the processor cores 115 from being specified as unavailable. The control module 310 may implement the CIM setting rules 355 to ensure that the interrupt controller 220 has a sufficient amount of processor power for handling interrupts. The CIM setting rules 355 may also be implemented through the CIM setting modules 320, such as in the first CIM setting module 320A. For example, when the first CIM setting module 320A attempts to set the bit specifying that the first processor core 115A is unavailable to handle interrupts, the CIM setting rules 355 may prevent the first CIM setting module 320A from setting the bit.

The interrupt controller 220 may also implement the interrupt mask register ("IMR") 315, in addition to the CIM 305. The IMR 315 may include a set of bits corresponding to one or more of the interrupt lines 225. When a bit is set in the IMR 315, the interrupt controller 220 may ignore interrupts received from the interrupt line corresponding to the set bit. Interrupts having an associated bit on the IMR 315 may be referred to as maskable interrupts. However, some interrupts referred to as non-maskable interrupts may not have an associated bit on the IMR 315. As such, non-maskable interrupts cannot be ignored through the use of the IMR 315.

According to some embodiments, the CIM 305 may make no distinction between maskable interrupts and non-maskable interrupts. For example, if a bit in the CIM 305 is set indicating that the first processor core 115A is unavailable, the interrupt controller 220 will guide the ISR 134 to another processor core, even for non-maskable interrupts. When both the CIM 305 and the IMR 315 are implemented, the interrupt controller 220 may read the CIM 305 prior to reading the IMR 315. Alternatively, when both the CIM 305 and the IMR 315 are implemented, the interrupt controller 220 may read the IMR 315 prior to reading the CIM 305. As previously described, the interrupt controller 220 may read the CIM 305 to determine which of the processor cores 115 are available to handle interrupts. The interrupt controller 220 may read the IMR 315 to determine whether a given interrupt is a maskable interrupt or a non-maskable interrupt. The interrupt controller 220 may be configured to ignore the makeable interrupts, but not the non-maskable interrupts.

Figure 4:
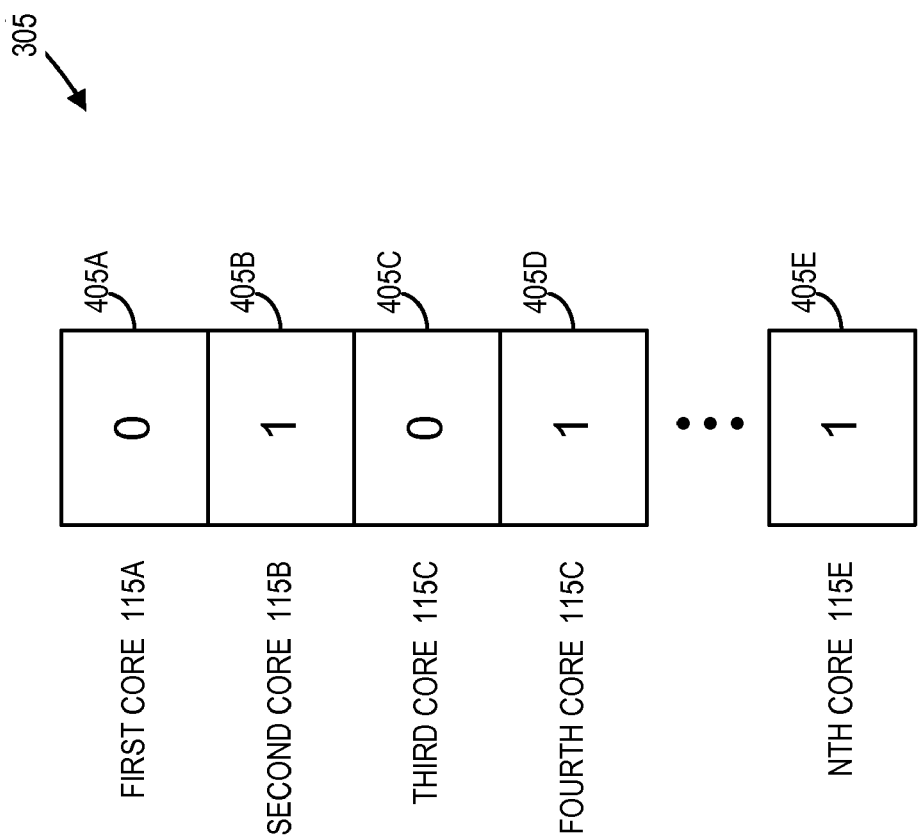
FIG. 4 is a block diagram illustrating mask bits associated with the CIM.

Turning now to FIG. 4, a block diagram illustrates mask bits associated with CIM 305, arranged according to at least some embodiments presented herein. The CIM 305 includes a first bit 405A, a second bit 405B, a third bit 405C, a fourth bit 405D, and an Nth bit 405E. The first bit 405A, the second bit 405B, the third bit 405C, the fourth bit 405D, and the Nth bit 405E correspond to the first processor core 115A, the second processor core 115B, the third processor core 115C, the fourth processor core 115D, and the Nth processor core 115E, respectively. The first bit 405A, the second bit 405B, the third bit 405C, the fourth bit 405D, and the Nth bit 405E may be referred to collectively, or generally, as CIM bits 405. Although not so limited, the CIM 305 as illustrated in FIG. 4 has one CIM bit 405 corresponding to each of the processor cores 115. In other embodiments, two or more of the CIM bits 405 may correspond to each of the processor cores 115. In yet other embodiments, each of the CIM bits 405 may correspond to two or more of the processor cores 115.

In the example illustrated in FIG. 4, the first bit 405A, the second bit 405B, the third bit 405C, the fourth bit 405D, and the Nth bit 405E are set to "0", "1", "0", "1", and "1" values, respectively. As previously described, in some implementations, a "1" value in the bit may indicate that the corresponding processor core is available, and a "0" value in the bit may indicate that the corresponding processor core is unavailable. In such implementations, the CIM 305 as illustrated in FIG. 4 may specify that the first processor core 115A and the third processor core 115C are unavailable because the first bit 405A and the third bit 405C are set to a "0" value. When the interrupt controller 220 receives an IRQ, the interrupt controller 220 may check the CIM 305. When the interrupt controller 220 reads that the first bit 405A and the third bit 405C have been set, the interrupt controller 220 may route the ISR 134 away from the first processor core 115A and the third processor core 115C to one of the available processor cores, such as the second processor core 115B, the fourth processor core 115C, and the Nth processor core 115E.

Figure 5:
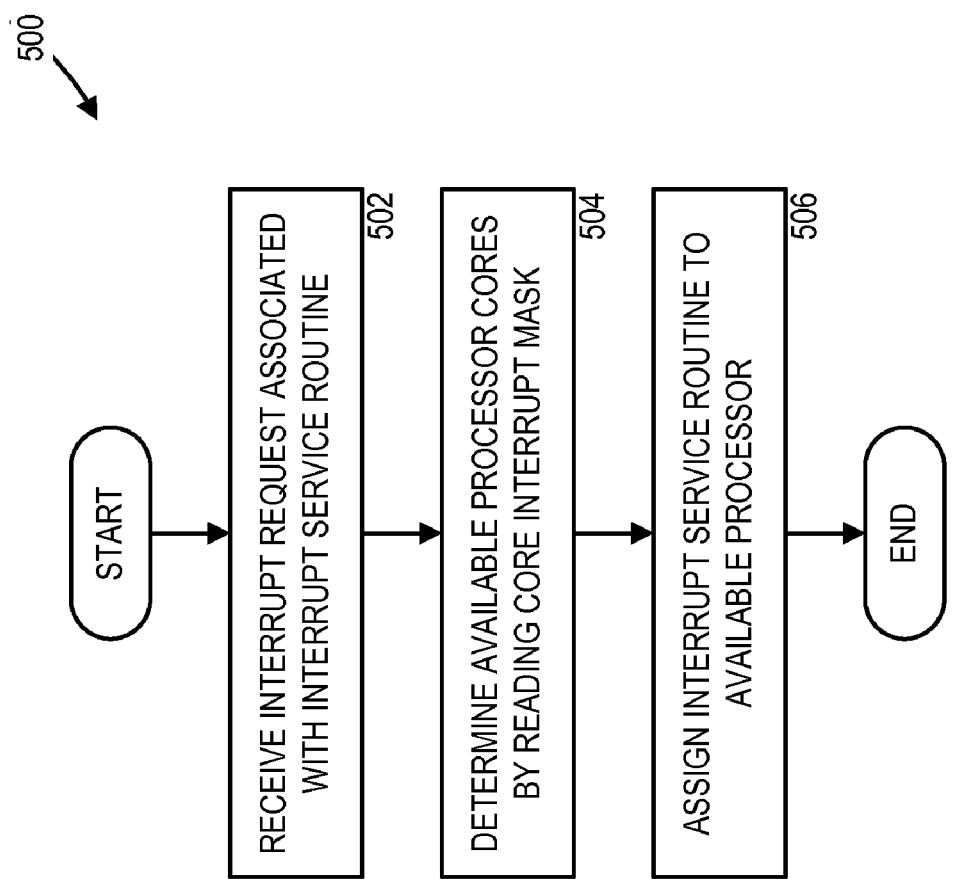
FIG. 5 is a flow diagram illustrating a process for handling interrupts in a multi-core processor computing system having the CIM.

Referring now to FIG. 5, additional details will be provided regarding the embodiments presented herein for interrupt masking in multi-core processors. In particular, FIG. 5 is a flow diagram illustrating a process 500 for handling interrupts in a multi-core processor computing system having the CIM 305, arranged according to at least some embodiments presented herein.

It should be appreciated that the operations described herein are implemented as a sequence of operational or manufacturing acts, as a sequence of computer implemented acts or program modules running on a computing system, or as interconnected machine logic circuits or circuit modules within the computing system. The implementation is a matter of choice dependent on the performance and other requirements of the various embodiments. Some of the logical operations described herein are referred to variously as state operations, structural devices, acts, or modules. These operations, functions, structural devices, acts and modules may be implemented in software, in firmware, in special purpose digital logic, and any combination thereof. It should also be appreciated that more or fewer operations may be performed than shown in the figures and described herein. These operations may also be performed sequentially, in parallel, or in a different order than those described herein.

The process 500 may include various operations, functions or actions as illustrated by one or more of blocks 502, 504, and/or 506. The process 500 may begin at block 502 (Receive Interrupt Associated with Interrupt Service Routine), where the interrupt controller 220 may receive an IRQ from the interrupt lines 225. The IRQ may be associated with an ISR, such as the ISR 134. Block 502 may be followed by block 504.

At block 504 (Determine Available Processor Cores), the interrupt controller 220, and in particular the ISR guide logic 235, may determine available processor cores by reading (i.e., evaluating) the CIM 305. For example, the CIM 305 may store bit values indicating the available processor cores and the unavailable processor cores in the processor cores 115. Block 504 may be followed by block 506.

At block 506 (Assign Interrupt Service Routine to Available Processor), the interrupt controller 220, and in particular the ISR guide logic 235, can assign the associated ISR 134 to one of the available processor cores as specified by the CIM 305. The interrupt controller 220 may also assign the IRQ to one of the available processor cores as specified by the CIM 305. After block 506, the process may either repeat (e.g., periodically, continuously, or on demand as needed) or terminate.

Figure 6:
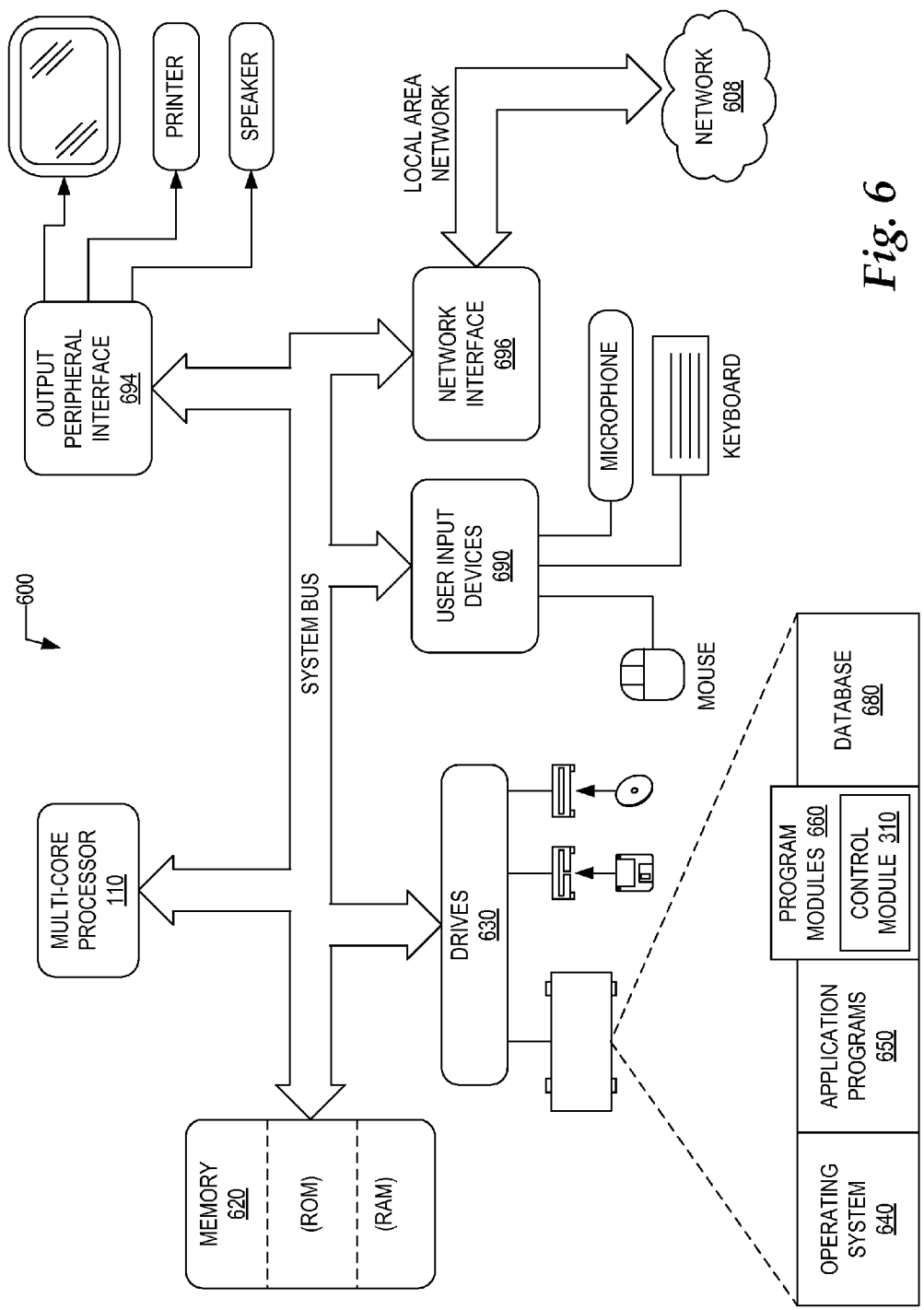
FIG. 6 is a block diagram illustrating an example computing system.

FIG. 6 is a computer architecture diagram showing an illustrative computer hardware architecture for a computing system capable of implementing at least some embodiments presented herein. FIG. 6 includes a computer 600, including the multi-core processor 110, memory 620 and one or more drives 630. The computer 600 may be implemented as a conventional computer system, an embedded control computer, a laptop, or a server computer, a mobile device, a set-top box, a kiosk, a vehicular information system, a mobile telephone, a customized machine, or other hardware platform. The processor 610 may be a general purpose processor, a processor core, a multiprocessor, a multi-core processor, a graphics processor, a digital signal processing ("DSP") processor, a customized computing device implemented within an application specific integrated circuit ("ASIC"), a customized computing device implemented within a field programmable gate array ("FPGA"), a customized computing device implemented within any type of programmable logic, a state machine, a reconfigurable processor, any other processing unit, or any combination or multiplicity thereof. According to some embodiments, the processor 610 may include the CIM 305, the interrupt controller 220, the IMR 315, and/or the CIM setting modules 320 as described previously.

The drives 630, and their associated computer storage media, can provide storage of computer readable instructions, data structures, program modules and other data for the computer 600. The drives 630 can include an operating system 640, application programs 650, program modules 660, and a database 680. The computer 600 further includes user input devices 690 through which a user may enter commands and data. Input devices can include an electronic digitizer, a microphone, a keyboard and pointing device, commonly referred to as a mouse, trackball or touch pad. Other input devices may include a joystick, game pad, satellite dish, scanner, or the like.

These and other input devices can be coupled to a processor 610 through a user input interface that is coupled to a system bus, but may be coupled by other interface and bus structures, such as a parallel port, game port or a universal serial bus ("USB"). Computers such as the computer 600 may also include other peripheral output devices such as speakers, which may be coupled through an output peripheral interface 694 or the like.

The computer 600 may operate in a networked environment using logical connections to one or more computers, such as a remote computer coupled to a network interface 696. The remote computer may be a personal computer, a server, a router, a network PC, a peer device or other common network node, and can include many or all of the elements described above relative to the computer 600. Networking environments are commonplace in offices, enterprise-wide area networks ("WAN"), local area networks ("LAN"), intranets and the Internet.

When used in a LAN or WLAN networking environment, the computer 600 is coupled to the LAN through the network interface 696 or an adapter. When used in a WAN networking environment, the computer 600 typically includes a modem or other means for establishing communications over the WAN, such as the Internet or the network 608. The WAN may include the Internet, the illustrated network 608, various other networks, or any combination thereof. It will be appreciated that other mechanisms of establishing a communications link, ring, mesh, bus, cloud, or network between the computers may be used.

According to some embodiments, the computer 600 may be coupled to a networking environment such that the processor 610 and/or the program modules 660 can handle interrupts within a multi-core processor, in accordance with embodiments herein. The computer 600 may include one or more instances of a physical computer-readable storage medium or media associated with the drives 630 or other storage devices. The system bus may enable the processor 610 to read code and/or data to/from the computer-readable storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 620, whether characterized as RAM, ROM, flash, or other types of volatile or nonvolatile memory technology. The media may also represent secondary storage, whether implemented as the storage drives 630 or otherwise. Hard drive implementations may be characterized as solid state, or may include rotating media storing magnetically-encoded information.

The storage media may include one or more program modules 660 such as the control module 310 and/or the ISR 134. The program modules 660 may include software instructions that, when loaded into the processor 610 and executed, transform a general-purpose computing system into a special-purpose computing system customized to handle interrupts within a multi-core processor as disclosed herein. As detailed throughout this description, the program modules 660 may provide various tools or techniques by which the computer 600 may participate within the overall systems or operating environments using the components, logic flows, and/or data structures discussed herein.

The processor 610 may be constructed from any number of transistors or other circuit elements, which may individually or collectively assume any number of states. More specifically, the processor 610 may operate as a state machine or finite-state machine. Such a machine may be transformed to a second machine, or specific machine by loading executable instructions contained within the program modules 660. These computer-executable instructions may transform the processor 610 by specifying how the processor 610 transitions between states, thereby transforming the transistors or other circuit elements constituting the processor 610 from a first machine to a second machine, wherein the second machine may be specifically configured to handle interrupts in a multi-core processor. The states of either machine may also be transformed by receiving input from the one or more user input devices 690, the network interface 696, other peripherals, other interfaces, or one or more users or other actors. Either machine may also transform states, or various physical characteristics of various output devices such as printers, speakers, video displays, or otherwise.

Encoding the program modules 660 may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules 660 may transform the physical state of the semiconductor memory 620 when the software is encoded therein. For example, the software may transform the state of transistors, capacitors, or other discrete circuit elements constituting the semiconductor memory 620.

As another example, the storage media may be implemented using magnetic or optical technology such as drives 630. In such implementations, the program modules 660 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description.

Figure 7:
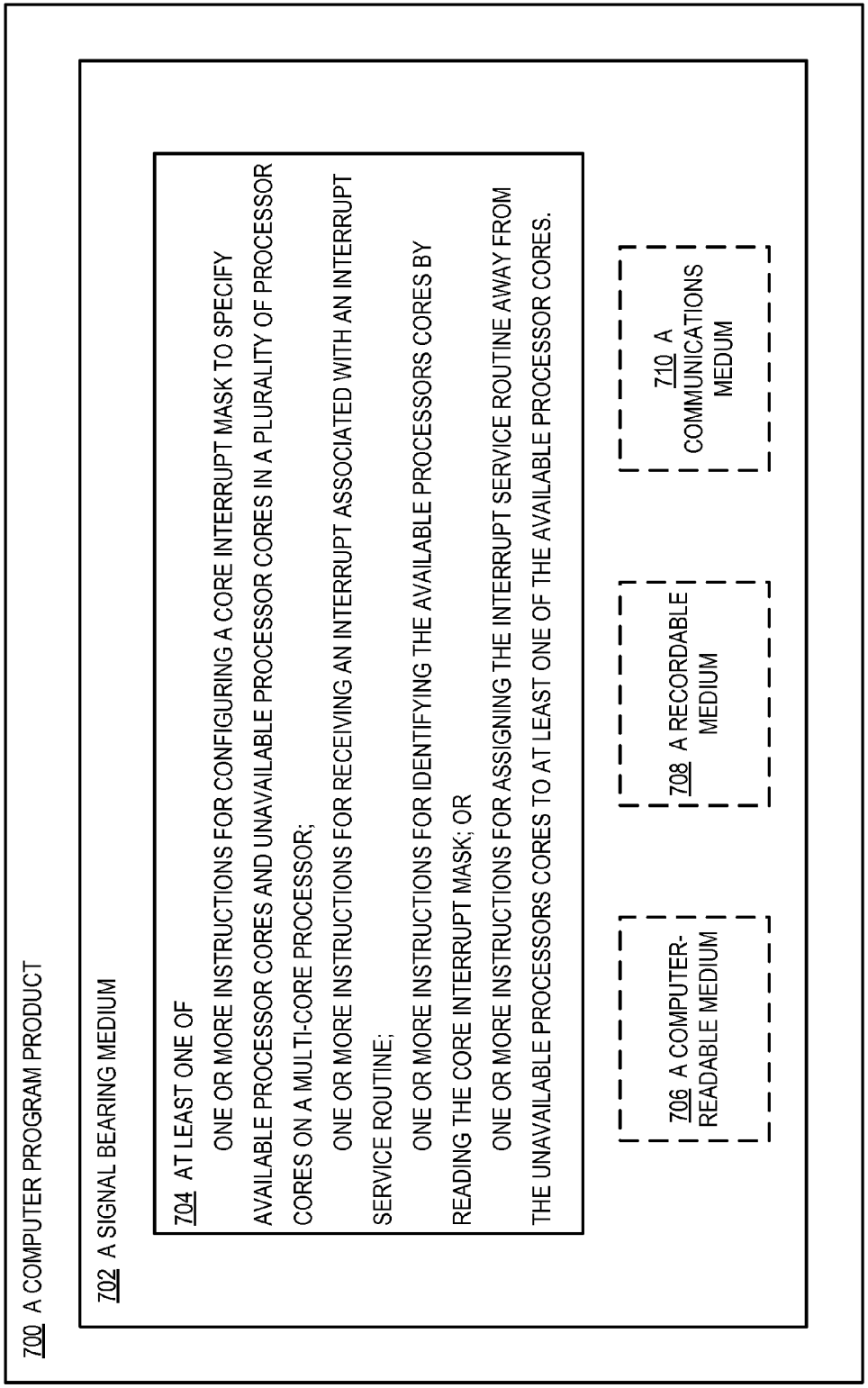
FIG. 7 is a schematic diagram illustrating a computer program product, all arranged according to at least some embodiments presented herein.

Turning now to FIG. 7, a schematic diagram that illustrates a partial view of a computer program product 700 that includes a computer program for executing a computer process on a computing device, arranged according to at least some embodiments presented herein. An illustrative embodiment of the example computer program product is provided using a signal bearing medium 702, and may include at least one instruction of 704: one or more instructions for configuring a core interrupt mask to specify available processor cores and unavailable processor cores in a plurality of processor cores on a multi-core processor; one or more instructions for receiving an interrupt associated with an interrupt service routine; one or more instructions for identifying the available processors cores by reading the core interrupt mask; or one or more instructions for assigning the interrupt service routine away from the unavailable processors cores to at least one of the available processor cores. The one or more instructions may be, for example, computer executable and/or logic implemented instructions. In some embodiments, the signal bearing medium 702 of the one or more computer program products 700 include a computer readable medium 706, a recordable medium 708, and/or a communications medium 710.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multi-core processor systems, microprocessor-based or programmable consumer electronics, minicomputers, mainframe computers, and the like.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g.,"a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for handling interrupts within a multi-core processor having a plurality of processor cores, the method comprising:
    initializing a core interrupt mask to specify each of the plurality of processor cores as either an available processor core or an unavailable processor core based on a status associated with each of the plurality of processor cores;
    setting the core interrupt mask to specify one or more of the plurality of processor cores as unavailable processor cores based on one or more setting criteria;
    receiving an interrupt associated with an interrupt service routine;
    evaluating the core interrupt mask to identify one or more available processor cores from the plurality of processor cores; and
    assigning the interrupt service routine associated with the received interrupt to at least one of the one or more available processor cores;
    wherein setting the core interrupt mask to specify one or more of the plurality of processor cores as unavailable processor cores based on one or more setting criteria comprises at least one of
        setting the core interrupt mask to specify a first one or more of the plurality of processor cores as unavailable processor cores when one or more respective caches associated with the first one or more of the plurality of processor cores contain a significant amount of data,
        setting the core interrupt mask to specify a second one or more of the plurality of processor cores as unavailable processor cores when the second one or more of the plurality of processor cores are positioned in physical proximity to one or more respective buses,
        setting the core interrupt mask to specify a third one or more of the plurality of processor cores as unavailable processor cores when the third one or more of the plurality of processor cores cooperate with each other, or
        setting the core interrupt mask to specify a fourth one or more of the plurality of processor cores as unavailable processor cores when the fourth one or more of the plurality of processor cores begin executing a task.

2. The method of claim 1, wherein the core interrupt mask comprises a register having a plurality of bits, each of the plurality of bits corresponding to a respective one of the plurality of processor cores, each of the plurality of bits storing either a first value or a second value, the first value specifying that the corresponding one of the plurality of processor cores is one of the available processor cores, the second value specifying that the corresponding one of the plurality of processor cores is one of the unavailable processor cores.

3. The method of claim 1, further comprising:
    monitoring a number of unavailable processor cores as specified by the core interrupt mask;
    determining whether the number unavailable processor cores exceeds a threshold; and
    reducing the number of the unavailable processor cores as specified by the core interrupt mask when the number of unavailable processor cores is determined to exceed the threshold.

4. The method of claim 1, further comprising:
    initializing the core interrupt mask to specify the plurality of processor cores as unavailable processor cores; and
    setting the core interrupt mask to specify one or more of the plurality of processor cores as available processor cores based on instructions from the one or more of the plurality of processor cores.

5. A system for handling interrupts within a multi-core processor including a plurality of processor cores, the system comprising:
    an interrupt line adapted to communicate an interrupt request to the multi-core processor;
    a core interrupt mask adapted to specify a status associated with each of the plurality of processor cores, wherein the status corresponds to either an available processor core or an unavailable processor core, wherein the core interrupt mask is adapted to set the status associated with one or more of the plurality of processor cores as unavailable when at least one of:
        one or more respective caches associated with the one or more of the plurality of processor cores contain a significant amount of data,
        the one or more of the plurality of processor cores are positioned in physical proximity to one or more respective buses,
        the one or more of the plurality of processor cores cooperate with each other, or
        the one or more of the plurality of processor cores begin executing a task; and
    an interrupt controller configured to
        receive the interrupt request via the interrupt line,
        evaluate the core interrupt mask to identify one or more available processor cores, and
        assign handling of the interrupt request to one of the available processor cores.

6. The system of claim 5, further comprising an interrupt mask register, wherein the interrupt mask register is adapted to specify whether interrupts received from the interrupt line are ignored by the interrupt controller.

7. The system of claim 5, wherein the interrupt request comprises a maskable interrupt and a non-maskable interrupt.

8. The system of claim 5, wherein the core interrupt mask comprises a register having a plurality of bits, each of the plurality of bits corresponding to a respective one of the plurality of processor cores, each of the plurality of bits storing either a first value or a second value, the first value specifying that the corresponding one of the plurality of processor cores is one of the available processor cores, the second value specifying that the corresponding one of the plurality of processor cores is one of the unavailable processor cores.

9. The system of claim 8, further comprising a control module configured to
    initialize the plurality of bits in the core interrupt mask to the first value, and
    set one or more of the plurality of bits from the first value to the second value based on one or more setting criteria.

10. The system of claim 8, wherein the plurality of processor cores are configured to
    initialize the plurality of bits in the core interrupt mask to the first value, and
    set one or more of the plurality of bits from the first value to the second value based on one or more setting criteria.

11. The system of claim 8, wherein the plurality of processor cores are configured to
    initialize the plurality of bits in the core interrupt mask to the second value, and
    set one or more of the plurality of bits from the second value to the first value when the respective processor cores corresponding to the one or more of the plurality of bits volunteer availability.

12. A computer storage medium having computer-executable instructions stored thereon which, when executed by a computer system that includes a multi-core processor with a plurality of processor cores, cause the computer system to:
    configure a core interrupt mask to specify a status associated with each of the plurality of processor cores, wherein the status corresponds to either an available processor core or an unavailable processor core, wherein, when a processor core is identified as an associated cache containing data that is not mirrored in other caches associated with other processor cores in the multi-core processor, the core interrupt mask is configured to specify the identified processor core as one of the unavailable processor cores;
    receive an interrupt request associated with an interrupt service routine;
    evaluate the core interrupt mask to identify one or more available processors; and
    assign the interrupt service routine away associated with the received interrupt request to at least one of the available processor cores.

13. The computer storage medium of claim 12, wherein the core interrupt mask comprises a register having a plurality of bits, each of the plurality of bits corresponding to a respective one of the plurality of processor cores, each of the plurality of bits storing either a first value or a second value, the first value specifying that the corresponding one of the plurality of processor cores is one of the available processor cores, the second value specifying that the corresponding one of the plurality of processor cores is one of the unavailable processor cores.

14. The computer storage medium of claim 12, wherein to configure a core interrupt mask to specify a status associated with each of the plurality of processor cores, the computer-executable instructions further cause the computer system to:
    identify a first processor core having physical proximity and cooperation with a second processor core in the multi-core processor; and
    set the core interrupt mask to specify the identified first processor core and the identified second processor core as the unavailable processor cores.

15. The computer storage medium of claim 12, wherein to configure a core interrupt mask to specify a status associated with each of the plurality of processor cores, the computer-executable instructions further cause the computer system to:
    identify a first processor core in the multi-core processor core having closer physical proximity to a bus;
    identify a second processor core in the multi-core processor core having greater physical proximity to the bus; and
    set the core interrupt mask to specify the identified first processor core as one of the unavailable processor cores and the identified second processor core as one of the available processor cores.

16. A method for handling interrupts within a multi-core processor having a plurality of processor cores, the method comprising:
    receiving an interrupt associated with an interrupt service routine;
    evaluating a core interrupt mask to identify one or more available processor cores from the plurality of processor cores, wherein the core interrupt mask specifies each of the plurality of processor cores as either an available processor core or an unavailable processor core based on a status associated with the each of the plurality of processor cores;
    assigning the interrupt service routine associated with the received interrupt to at least one of the one or more available processor cores;
    monitoring a number of unavailable processor cores as specified by the core interrupt mask;
    determining whether the number unavailable processor cores exceeds a threshold; and
    reducing the number of the unavailable processor cores as specified by the core interrupt mask when the number of unavailable processor cores is determined to exceed the threshold.

17. A method for handling interrupts within a multi-core processor having a plurality of processor cores, the method comprising:
    receiving an interrupt associated with an interrupt service routine;
    evaluating a core interrupt mask to identify one or more available processor cores from the plurality of processor cores, wherein the core interrupt mask specifies each of the plurality of processor cores as either an available processor core or an unavailable processor core based on a status associated with the each of the plurality of processor cores;
    assigning the interrupt service routine associated with the received interrupt to at least one of the one or more available processor cores;
    initializing the core interrupt mask to specify the plurality of processor cores as unavailable processor cores; and
    setting the core interrupt mask to specify one or more of the plurality of processor cores as available processor cores based on instructions from the one or more of the plurality of processor cores.

* * * * *

UNITED STATES PATENT AND TRADEMARK OFFICE
CERTIFICATE OF CORRECTION

PATENT NO.       : 8,234,431 B2                                    Page 1 of 1
APPLICATION NO.  : 12/578270
DATED            : July 31, 2012
INVENTOR(S)      : Kruglick It is certified that error appears in the above-identified patent and that said Letters Patent is hereby corrected as shown below:

In Fig. 4, Sheet 4 of 7, delete "FOURTH CORE 115C" and insert
-- FOURTH CORE 115D --, therefor.

In Column 2, Line 48, delete "media 130" and insert -- media device 130 --, therefor.

In Column 2, Line 50, delete "media 130" and insert -- media device 130 --, therefor.

In Column 10, Line 22, delete "115C," and insert -- 115D, --, therefor.

In Column 15, Line 50, in Claim 1, delete "of" and insert -- of: --, therefor.

Signed and Sealed this
Ninth Day of April, 2013

Teresa Stanek Rea
*Acting Director of the United States Patent and Trademark Office*